United States Patent [19]
Pienaar

[11] Patent Number: 5,769,591
[45] Date of Patent: Jun. 23, 1998

[54] FRAME STRUCTURE AND METHOD OF PACKING VEHICLE BODIES

[75] Inventor: Salmon Pienaar, Port Elizabeth, South Africa

[73] Assignee: Kar-Tainer International, Inc., Decatur, Ga.

[21] Appl. No.: 260,058

[22] Filed: Jun. 15, 1994

Related U.S. Application Data

[63] Continuation of Ser. No. 13,302, Feb. 4, 1993, abandoned.

[51] Int. Cl.⁶ ............................................. E04H 6/06
[52] U.S. Cl. ........................ 414/400; 414/391; 414/395; 414/608; 414/498; 414/229; 410/26
[58] Field of Search ................................. 414/607, 608, 414/400, 401, 391, 392, 395, 396, 390, 373; 410/3, 4, 7, 8, 9, 10, 13, 14, 17, 24, 26, 27, 29.1, 43, 66; 108/53.1, 54.1, 56.1, 55.5

[56] References Cited

U.S. PATENT DOCUMENTS

| | | |
|---|---|---|
| 362,453 | 5/1887 | Lozier . |
| 982,046 | 1/1911 | Flemming ............................. 410/30 X |
| 1,247,553 | 11/1917 | Linquist et al. . |
| 1,263,788 | 4/1918 | Michod . |
| 1,276,556 | 8/1918 | Michod . |
| 1,282,766 | 10/1918 | Daly .................................... 410/25 X |
| 1,661,439 | 3/1928 | Michod ................................... 410/43 |
| 1,724,556 | 8/1929 | Blakely ................................. 410/9 X |
| 1,750,129 | 3/1930 | Romine ................................ 410/26 X |
| 1,869,054 | 7/1932 | Evans ...................................... 410/18 |
| 1,892,589 | 12/1932 | Snyder . |
| 1,978,287 | 10/1934 | Thomas . |
| 2,016,430 | 10/1935 | Hice ....................................... 410/25 |
| 2,098,184 | 11/1937 | Fehr et al. ............................... 410/25 |
| 2,492,829 | 12/1949 | Baler ................................... 410/25 X |
| 2,617,368 | 11/1952 | McCormick . |
| 2,838,338 | 6/1958 | Kerley et al. . |
| 2,906,405 | 9/1959 | Erickson ........................... 414/608 X |
| 2,968,260 | 1/1961 | Scheldrup ................................. 410/3 |
| 3,043,454 | 7/1962 | Butler et al. ............................ 414/679 |
| 3,511,392 | 5/1970 | Blunden et al. . |
| 3,618,796 | 11/1971 | Peisner . |
| 3,650,416 | 3/1972 | Bodenheimer . |
| 3,667,635 | 6/1972 | Hackney ................................ 414/498 |
| 3,675,795 | 7/1972 | Dluhy .................................. 410/24 X |
| 4,124,119 | 11/1978 | Nordstrom .......................... 410/13 X |
| 4,310,271 | 1/1982 | Canellis et al. ..................... 410/24 X |
| 4,455,119 | 6/1984 | Smith .................................... 414/537 |
| 4,597,712 | 7/1986 | Smith .................................... 414/549 |
| 4,668,141 | 5/1987 | Petersen ................................. 410/12 |

(List continued on next page.)

FOREIGN PATENT DOCUMENTS

| | | |
|---|---|---|
| 961699 | 1/1975 | Canada ................................. 105/179 |
| 0468349A1 | 7/1991 | European Pat. Off. . |
| 1202387 | 5/1958 | France . |
| 1201707 | 7/1959 | France ...................................... 410/3 |
| 1135782 | 8/1954 | Germany . |
| 46-15524 | 4/1971 | Japan . |
| 56-4584 | 1/1981 | Japan . |
| 57-30310 | 7/1982 | Japan . |
| 61-115744 | 6/1986 | Japan . |
| 1006496 | 8/1963 | United Kingdom . |
| 2050304 | 11/1979 | United Kingdom . |
| WO81/01997 | 12/1981 | WIPO . |
| WO90/11911 | 4/1989 | WIPO . |

*Primary Examiner*—Frank E. Werner
*Attorney, Agent, or Firm*—Stratton Ballew PLLC

[57] ABSTRACT

This apparatus relates to a frame structure for packing multiple vehicles in a stacked configuration into a transport container such that a first vehicle is located above the floor of the container and inclined relative to that floor. The structure includes a base, at least one vehicle support device including two vehicle supports each having a support member vertically and laterally displaced from one another, and attachment devices including at least one pair of attachment members having brackets for being attached across the bottom of the vehicle, laterally spaced from one another and received within receptacle zones defined within the respective vehicle supports, the attachment members being parallel to the vehicle supports.

7 Claims, 5 Drawing Sheets

U.S. PATENT DOCUMENTS

| | | | |
|---|---|---|---|
| 4,768,916 | 9/1988 | Gearin et al. | 414/498 |
| 4,797,049 | 1/1989 | Gearin et al. | 414/400 |
| 4,917,557 | 4/1990 | Kato et al. | 414/608 X |
| 4,919,582 | 4/1990 | Bates et al. | 414/233 |
| 4,957,407 | 9/1990 | Gearin | 414/498 |
| 4,963,067 | 10/1990 | Gearin et al. | 414/400 |
| 5,040,935 | 8/1991 | Gearin et al. | 414/400 |
| 5,040,938 | 8/1991 | Gearin et al. | 414/572 |
| 5,105,951 | 4/1992 | Gearin et al. | 211/13 |
| 5,106,246 | 4/1992 | Chance | 410/26 |
| 5,213,458 | 5/1993 | Preller et al. | 414/608 X |
| 5,253,975 | 10/1993 | Takaguchi | 414/786 |
| 5,415,505 | 5/1995 | Halpin et al. | 410/9 |
| 5,417,332 | 5/1995 | Gearin et al. | 211/13 |
| 5,445,278 | 8/1995 | Gearin et al. | 211/13 |
| 5,454,672 | 10/1995 | Halpin et al. | 410/26 |
| 5,470,490 | 11/1995 | Gearin et al. | 211/13 |
| 5,482,167 | 1/1996 | Gearin et al. | 211/13 |
| 5,505,581 | 4/1996 | Gearin et al. | 414/498 |
| 5,553,716 | 9/1996 | Gearin et al. | 211/13 |

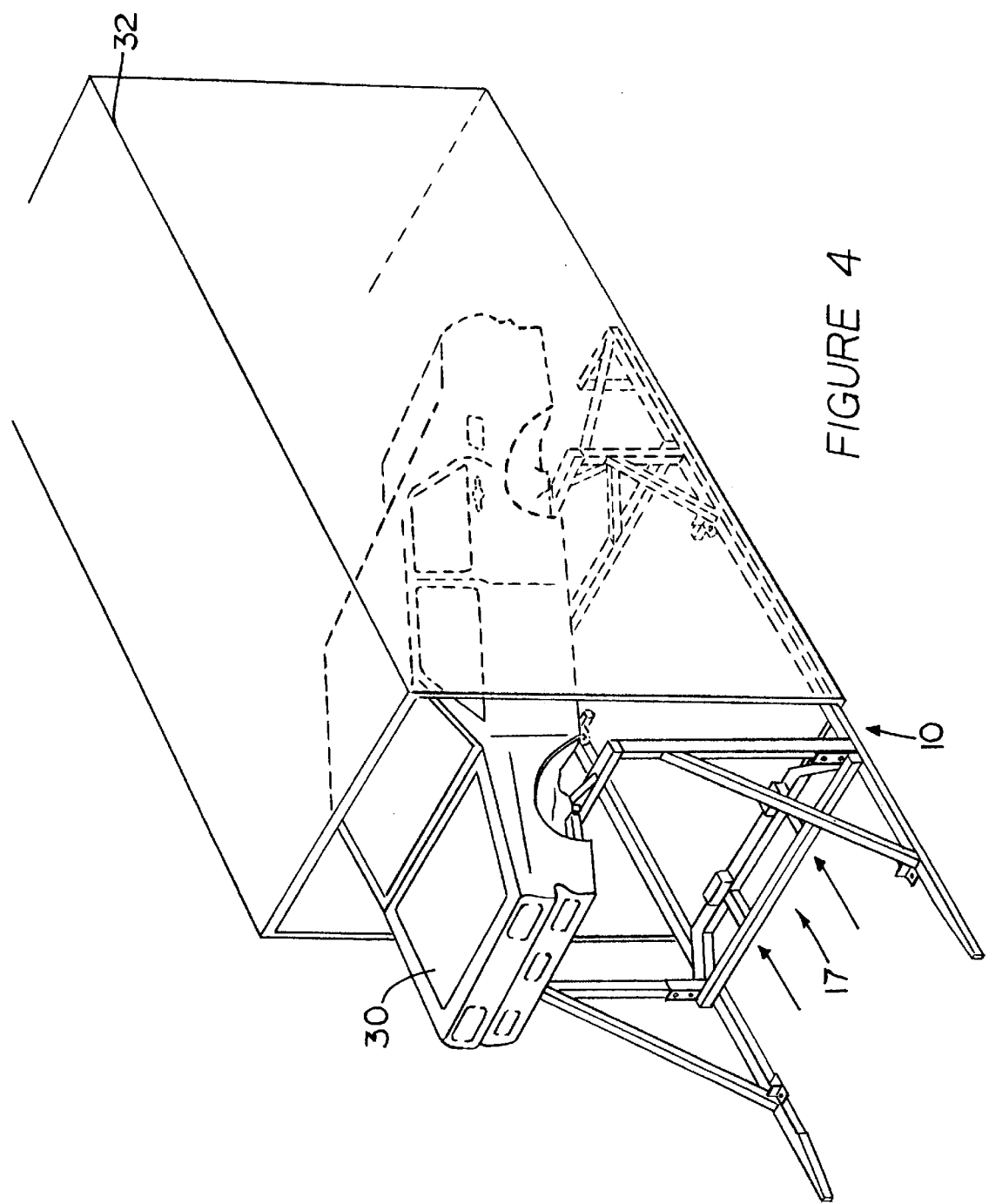

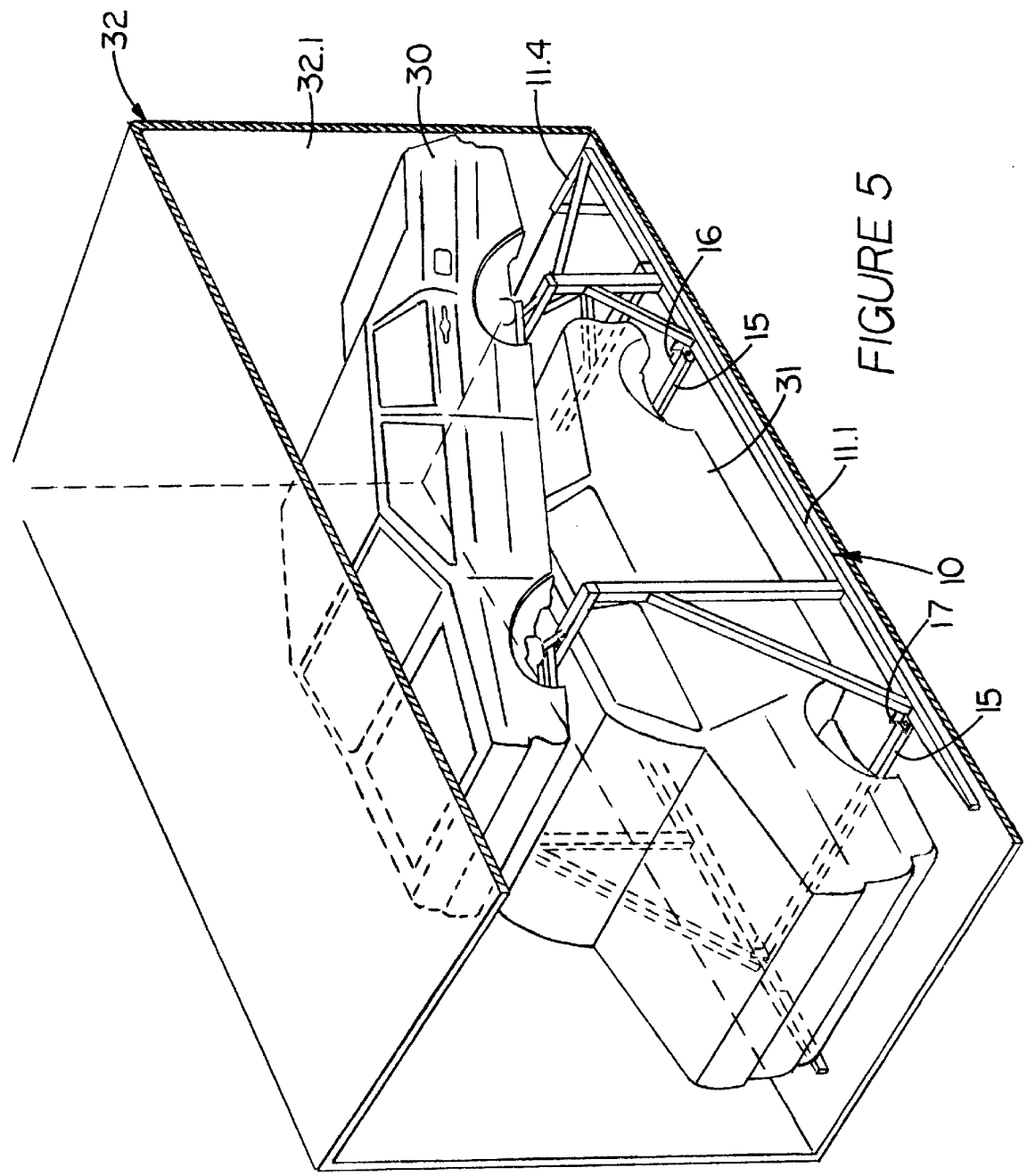

FRAME STRUCTURE AND METHOD OF PACKING VEHICLE BODIES

This application is a continuation of U.S. Application Ser. No. 08/013,302 filed Feb. 4, 1993, now abandoned.

TECHNICAL FIELD

This invention relates to a frame structure and more particularly it relates to such a structure suitable for packing vehicle bodies in a transport container. The invention also relates to a method of packing vehicles into a transport container.

DISCLOSURE OF THE INVENTION

According to a first aspect of the present invention, a frame structure suitable for packing vehicle bodies in a transport container comprises a base and vehicle support means mountable to a first vehicle body to support the said body in an inclined position relative to the base, the vehicle support means being adapted in use to accommodate a second vehicle body at least partly beneath the first vehicle body.

The base may comprise two elongate base members spaced apart from, and substantially parallel to each other thereby to define an elongate base with a first or front end and a second or rear end. The base may also include a stopper means mounted to the front end of the base, the stopper means in use stopping the frame structure against a container wall thereby to position the frame structure in the desired position within the container. The stopper means may comprise two stopper members each of which is mounted transversely to a base member at the front end of the base.

The support means preferably comprises a lower and an upper vehicle support means which means are mounted across the base, spaced apart from each other, the lower vehicle support means in use supporting the lower end of the first vehicle body and the upper vehicle support means in use supporting the upper end of the first vehicle body. The lower vehicle support member may be mounted towards the front end of the base and the upper support means towards the rear end of the base.

The upper vehicle support means, but preferably also the lower vehicle support means, may comprise a support member in use located across the base and elevated therefrom, and two upright members in use supporting the support member towards opposite ends thereof. The support member is preferably permanently secured to the upright members. The support means preferably include attachment means for attaching the vehicle body thereto. The frame structure preferably includes two attachment means, one for the upper support means and one for the lower support means, the attachment means comprising an attachment member and one or more brackets attached thereto, the brackets in use being attachable to the vehicle body and the attachment member being attachable to the support member. Each support member preferably includes a receptacle zone for receiving the attachment member.

In use the attachment means are mounted in a spaced relationship to each other across the bottom of the first vehicle body by means of their brackets. The vehicle is then hoisted and placed on the support members with the attachment members resting in the receptacle zones of the support members. The attachment members are then secured to the support members thereby to mount the first vehicle body to the frame structure.

The upright members of the support members may be supported struts.

The frame structure may include a spacer member mounted or mountable between the base members thereby to strengthen the structure. The spacer member preferably also supports the upright members of the lower vehicle support member thereby further to strengthen the frame structure.

The frame structure may further include additional vehicle support means for supporting the second vehicle body. The additional vehicle support means may be adapted in use to support the second vehicle in an inclined position relative to the base, but preferably it supports the second vehicle in a substantially parallel position parallel to the base. The additional vehicle support means may be slidingly receivable between the base members thereby in use allowing the second vehicle body, pre-mounted on the support means, to be slid into a position partly beneath the first vehicle body.

The frame structure preferably includes two additional vehicle support means, each means comprising an attachment member and one or more brackets attached thereto, the brackets being suitable in use to attach the attachment means across the bottom of the vehicle in a spaced relationship to each other.

The frame structure may also include locating means for locating the additional vehicle support means in the desired location when the second vehicle body is slid into position beneath the first vehicle body. The frame structure also includes securing means for securing the additional vehicle support means to the frame structure.

The frame structure may further also include a catch means onto which a device for loading the frame structure may catch in use to load the frame structure into a transport container. The catch means preferably comprises a body and catch formations mounted thereto onto which a loading device such as a fork-lift may catch. The catch means is preferably removably mountable to the frame structure to be removed once the frame structure is loaded into a transport container.

According to a second aspect of the invention there is provided a method of packing vehicle bodies into a transport container comprising the steps of:

providing a frame structure as described hereinabove;

mounting a first vehicle on the one or more support member in order that it is located in an inclined position relative to the base;

sliding the frame structure with the first vehicle mounted thereon into a container;

sliding a second vehicle body into the container in a position partly below the first vehicle.

The second vehicle body is preferably mounted on additional vehicle support members prior to it being slid into the container. The second vehicle body is preferably slid nose first underneath the first vehicle body.

Without thereby limiting the scope of the invention and by means of example only one embodiment thereof will now be described with reference to the accompanying drawings wherein.

BRIEF DESCRIPTION OF THE DRAWINGS

FIG. 4 is a perspective view of the frame structure of FIG. 1 partly loaded in a transport container; and FIG. 5 is a perspective view of the frame structure of FIG. 1 supporting two vehicles within a transport container.

In the accompanying drawings the same reference numerals are used to denote corresponding parts.

DETAILED DESCRIPTION OF PREFERRED EMBODIMENTS

Figure 1:
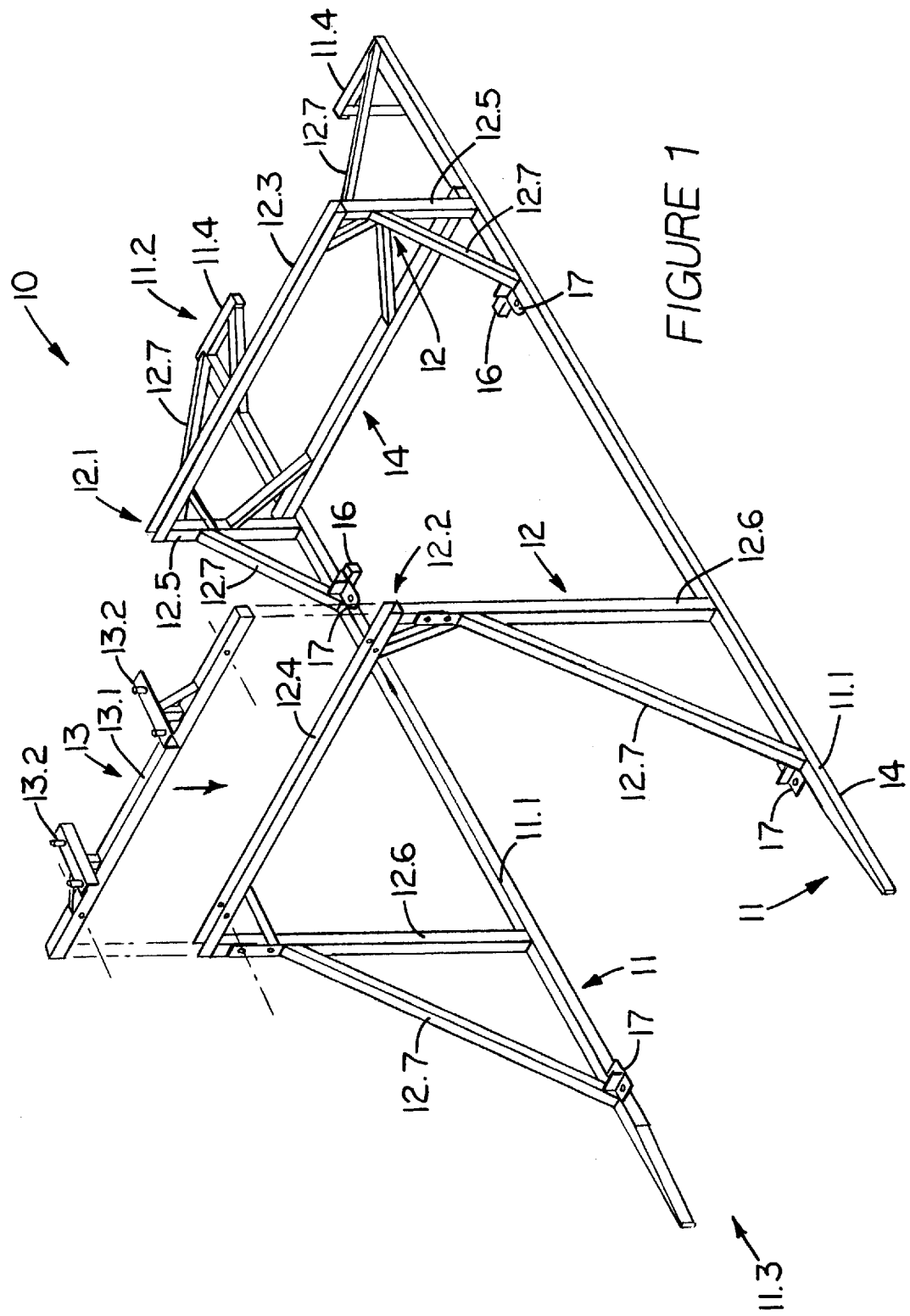
FIG. 1 is a perspective view of the frame structure according to the invention.

Referring now to the drawings and especially but not exclusively to FIG. 1, a frame structure 10 suitable for packing vehicle bodies 30 and 31 in a transport container 32 (as shown in FIG. 5) comprises a base 11; and vehicle support means 12 mountable to a first vehicle body 30. The support means 12 in use supports the vehicle body 30 in an inclined position relative to the base 11 and is adapted in use to accommodate a second vehicle body 31 at least partly beneath the first vehicle body 30.

The base 11 comprises two elongate base members 11.1, spaced apart from and parallel to each other thereby to define an elongate base with a first or front end 11.2 and a second or rear end 11.3. The base includes a stopper means in the form of two stopper members 11.4 each of which is mounted transversely to an end of a base member 11.1 at the front end 11.3 of the base. The stopper members 11.4 in use stops the structure 10 against the container wall 32.1 (FIG. 5) to position the structure in the desired position, that is with the lower end of the vehicle body 30 held spaced from the container wall 32.1.

The support means 12 comprises a lower vehicle support means 12.1 and an upper vehicle support means 12.2 mounted across the base 11 and spaced apart from each other. The lower vehicle support means 12.1 is mounted towards the front end 11.2 of the base 11 and in use supports the lower end of the vehicle body 30. The upper vehicle support means 12.2 is mounted towards the rear end 11.3 of the base and in use supports the upper end of the vehicle body 30.

Figure 2:
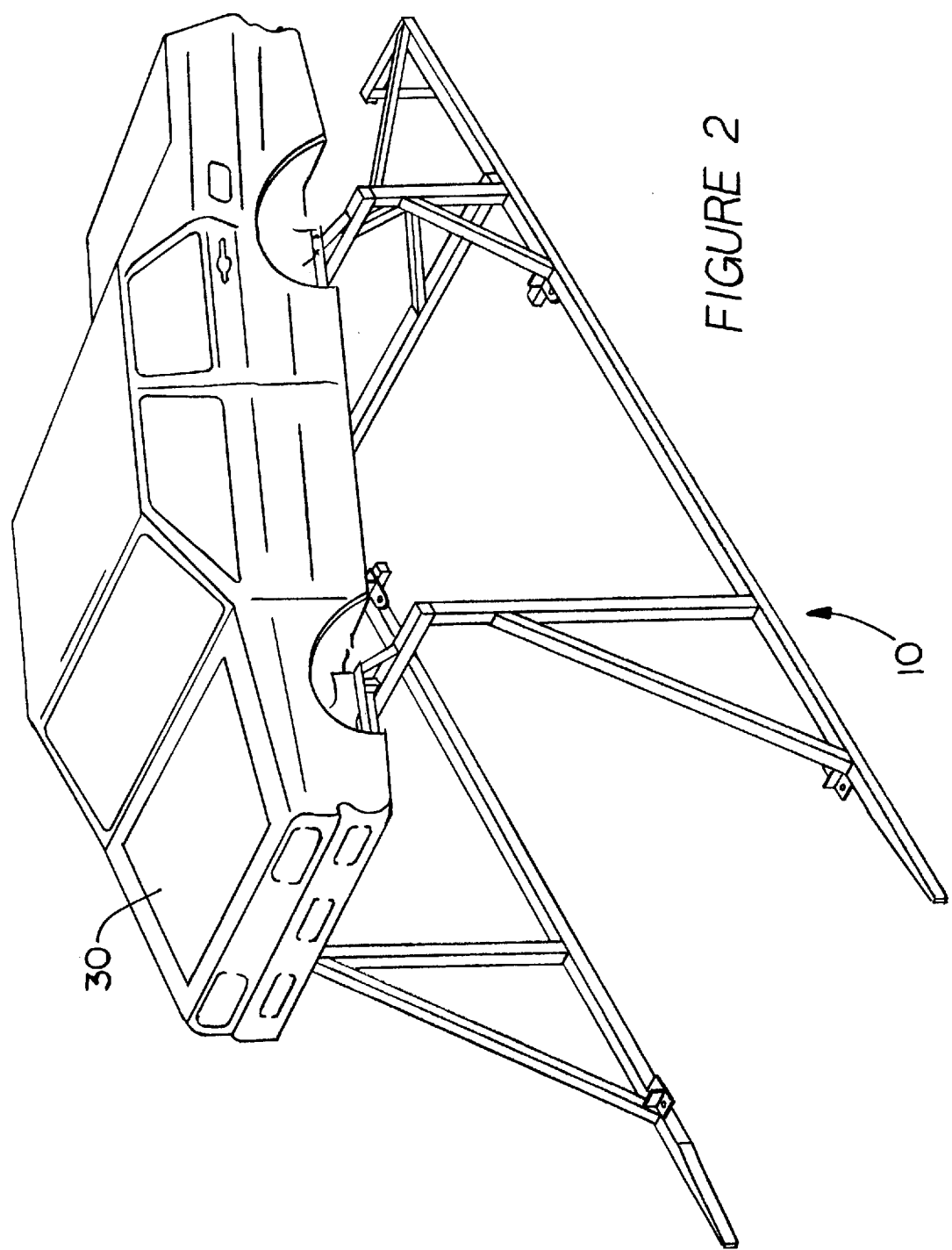
FIG. 2 is a perspective view of the frame structure of FIG. 1 whereupon a first vehicle body is mounted.

Each vehicle support means 12.1 and 12.2 respectively comprises a channel-shaped support member 12.3 and 12.4 respectively located across the base and elevated therefrom and two upright members 12.5 and 12.6 for supporting the support member at opposite ends thereof. The support means 12 include two attachment means 13 (only one of them being shown in FIG. 1), one for each of the support means 12.1 and 12.2 respectively, the attachment means 13 in use attaching the vehicle body 30 to the support members. Each attachment means 13 comprises an attachment member 13.1 and two brackets 13.2 In use (as shown in FIG. 2) the vehicle body 30 is secured to the brackets 13.2 and the vehicle body 30 is then hoisted onto the support means 12 with the attachment members 13.1 sliding into the receptacle zone of the channel-shaped support members 12.3 and 12.4 The attachment members 13.1 are then secured to the support members 12.3 and 12.4.

The upright members 12.5 and 12.5 are supported by struts 12.7.

The frame structure 10 further includes a spacer member 14 mounted between the base members 11.1 thereby to strengthen the structure. The spacer member 14 also supports the upright members 12.5 thereby further to strengthen the structure.

The frame structure also includes additional vehicle support means 15 (as shown in FIG. 5) for supporting the second vehicle body 31. The additional vehicle support means 15 are similar to the vehicle support means 13 and support the second vehicle body 31 substantially parallel to the base 11. The support means 15 are slidingly receivable between the base members 11.1 thereby in use allowing the second vehicle body 31, pre-mounted on the support means 15, to be slid into positions partly beneath the first vehicle body 30.

The frame structure 10 also includes a locating means 16 (FIG. 5) which in use locates the additional vehicle support means 15 in the desired position when the second vehicle body 31 is slid into position partly beneath the first vehicle body 30. The structure 10 also includes securing means 17 for securing the support means 15 to the frame structure 10.

The structure 10 further includes a catch means 18 (FIG. 3) onto which a device such as a fork-lift (not shown) may catch in use to load the frame structure 10 into a transport container 32. The catch means 18 comprises a body 18.1 and catch formation 18.2 The catch means 18 is removably mountable to the frame structure 10.

In use the first vehicle body 30 is mounted onto the attachment means 13 by means of the brackets 13.2. The vehicle body 30 is then hoisted up and the attachment members 13.1 are slid into the channel-shaped support members 12.4, the attachment members 13.1 being substantially parallel with the respective channel-shaped support members 12.4, and thereafter secured thereto (FIG. 2).

Figure 3:
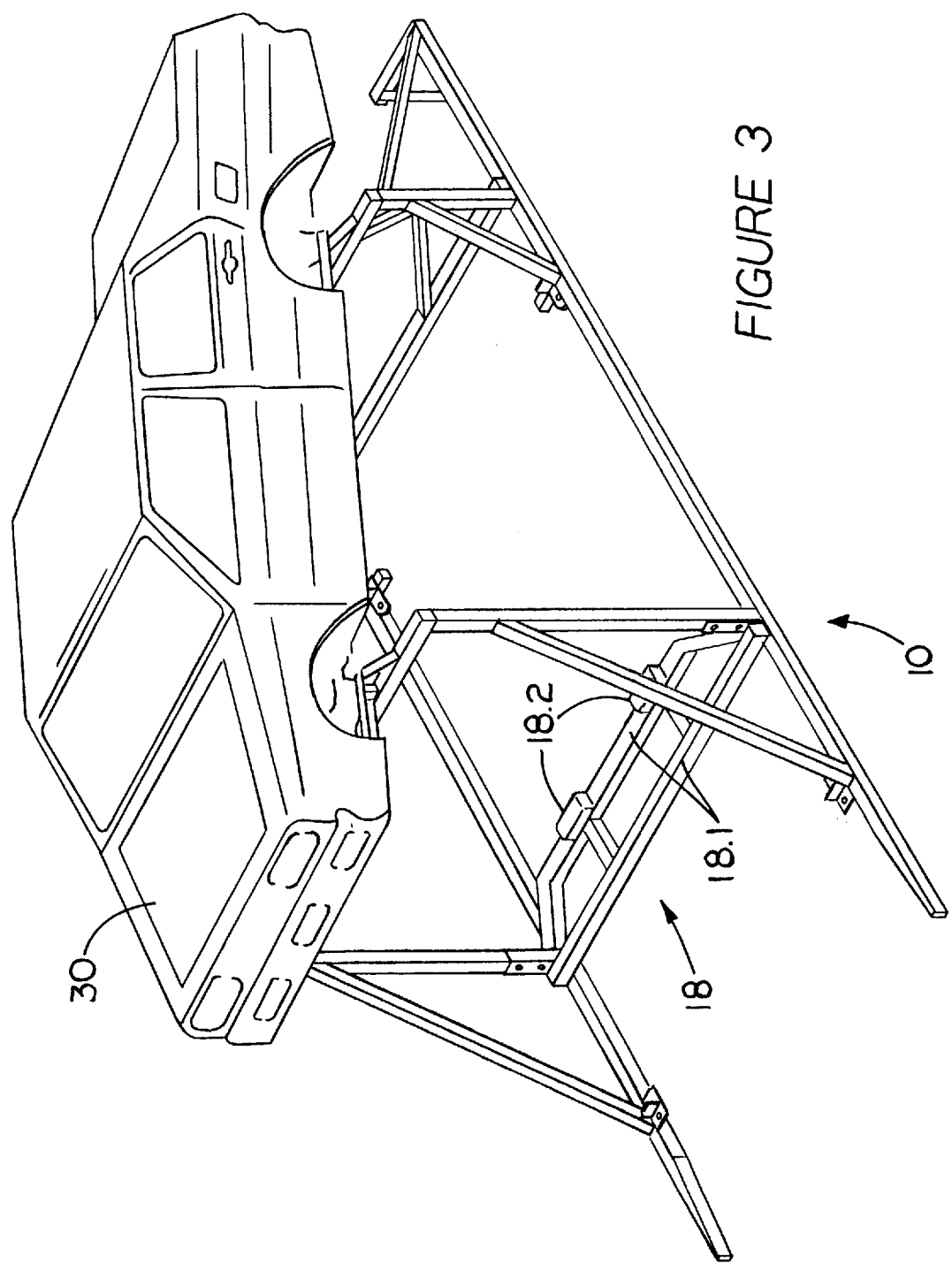
FIG.3 is a perspective view of the frame structure of FIG. 1 with a catch means mounted thereto.

The catch means 18 is then mounted to the frame structure 10 (FIG. 3). A fork-lift or similar device (not shown) is then used to slide the structure 10 into a container 32 (FIG. 4) until the stop members 11.4 comes up against the container wall 32.1. The catch means 18 is then removed.

The second vehicle body 31 is then mounted on additional vehicle support means 15 and is slid into position party underneath the first vehicle body 30. As the second vehicle body 31 is slid into the container 32 the front additional vehicle support means 15 engages the locating means 16 to stop the body in the desired position. The additional vehicle support means 15 are then secured to the base members 11.1 by means of the securing means 17.

As a last step the frame structure 10 may be secured to the container 32.

In compliance with the statute, the invention has been described in a language more or less specific as to structural features. It is understood, however, that the invention is not limited to the specific features shown, since the means and construction herein disclosed comprise preferred forms of putting the invention to effect. The invention is, therefore, claimed in any of its forms or modifications within the legitimate and valid scope of the appended claims.

I claim:

1. A frame structure suitable for packing vehicle bodies into a transport container the transport container having a floor and at least one wall, the frame structure comprising:

a base which in use rests on the container floor, the base comprises two elongated base members spaced apart from, and substantially parallel to each other thereby to define an elongated base with a front end and a rear end;

a vehicle support means for supporting a first vehicle body in an inclined position relative to the base, the vehicle support means comprises a lower vehicle support member and an upper vehicle support member, the members being mounted across the base in a horizontally and vertically spaced relationship relative to each other, the lower vehicle support member being relatively close to the base in use to support a lower end of the first vehicle body, and the upper vehicle support member being relatively high from the base in use to support an upper end of the first vehicle body; and attachment means for securing the first vehicle body to both the upper support member and the lower support member, the frame structure being adapted in use to fit into the said container and to receive a second vehicle body at least partly beneath the first vehicle body.

2. The structure of claim 1 wherein the attachment means comprises:

two attachment members, one for mounting the first vehicle body to the upper support member and the other for mounting the first vehicle body to the lower support member, each attachment member comprising a cross-member which is attachable to a vehicle support member; and at least one bracket on the cross-member for attaching the cross-member to the vehicle body to extend transversely below it.

3. The structure of claim 2 wherein each support member includes a receptacle zone for receiving the attachment member.

4. A frame structure suitable for packing vehicle bodies into a transport container the transport container having a floor and at least one wall, the frame structure comprising:

a base which in use rests on the container floor, the base comprising two elongated base members spaced apart from, and substantially parallel to each other thereby to define an elongated base with a front end and a rear end;

a vehicle support means for supporting a first vehicle body in an inclined position relative to the base, the vehicle support means comprising a lower vehicle support member and an upper vehicle support member, the lower vehicle support member and the upper vehicle support member being mounted across the base in a horizontally and vertically spaced relationship relative to each other, the lower vehicle support member being relatively close to the base in use to support a lower end of the first vehicle body, and the upper vehicle support member being relatively high from the base in use to support an upper end of the first vehicle body, the lower vehicle support member may be mounted toward the front end of the base and the upper vehicle support member may be mounted towards the rear end of the base;

attachment means for attaching the first vehicle body onto the vehicle support means of the structure; and additional vehicle support means for supporting a second vehicle body above the container floor, the additional vehicle support means is separable from the frame structure and is slidingly receivable between the base members thereby in use allowing the second vehicle body, pre-mounted on the support means, to be slidingly received in a position partly beneath the first vehicle body;

the frame structure being adapted in use to fit into the container and to receive a second vehicle body at least partly beneath the first vehicle body.

5. The structure of claim 4 further including a catch means to which a device for loading the frame structure may in use engage to load the frame structure into the transport container.

6. A frame structure suitable for packing vehicle bodies into a transport container the transport container having a floor and at least one wall, the frame structure comprising:

a base which in use rests on the container floor, the base comprising two elongated base members spaced apart from, and substantially parallel to each other thereby to define an elongated base with a front end and a rear end;

a vehicle support means for supporting a first vehicle body in an inclined position relative to the base, the vehicle support means comprising a lower vehicle support member and an upper vehicle support member, the lower vehicle support member and the upper vehicle support member being mounted across the base in a horizontally and vertically spaced relationship relative to each other, the lower vehicle support member being relatively close to the base in use to support a lower end of the first vehicle body, and the upper vehicle support member being relatively high from the base in use to support an upper end of the first vehicle body, the lower vehicle support member may be mounted toward the front end of the base and the upper vehicle support member may be mounted towards the rear end of the base;

attachment means for attaching the first vehicle body onto the vehicle support means of the structure;

additional vehicle support means for supporting a second vehicle body above the container floor, the additional vehicle support means comprising two support members, each member comprising a cross-bar and at least one bracket attached thereto, the bracket being suitable in use to attach the cross-bar transversely across the bottom of the vehicle; and the frame structure being adapted in use to fit into the container and to receive a second vehicle body at least partly beneath the first vehicle body.

7. A frame structure suitable for packing vehicle bodies into a transport container the transport container having a floor and at least one wall, the frame structure comprising:

a base which in use rests on the container floor, the base comprising two elongated base members spaced apart from, and substantially parallel to each other thereby to define an elongated base with a front end and a rear end;

a vehicle support means for supporting a first vehicle body in an inclined position relative to the base, the vehicle support means comprising a lower vehicle support member and an upper vehicle support member, the lower vehicle support member and the upper vehicle support member being mounted across the base in a horizontally and vertically spaced relationship relative to each other the lower vehicle support member being relatively close to the base in use to support a lower end of the first vehicle body and the upper vehicle support member being relatively high from the base in use to support an upper end of the first vehicle body, the lower vehicle support member may be mounted toward the front end of the base and the upper vehicle support member may be mounted towards the rear end of the base;

attachment means for attaching the first vehicle body onto the vehicle support means of the structure;

additional vehicle support means for supporting a second vehicle body above the container floor; and locating means for locating the additional vehicle support means in the desired location when the second vehicle body is slid into position beneath the first vehicle body;

the frame structure being adapted in use to fit into the container and to receive a second vehicle body at least partly beneath the first vehicle body.

* * * * *